Oct. 19, 1965  J. W. MARTIN  3,212,324
PEAK READING INDICATOR
Filed July 18, 1961
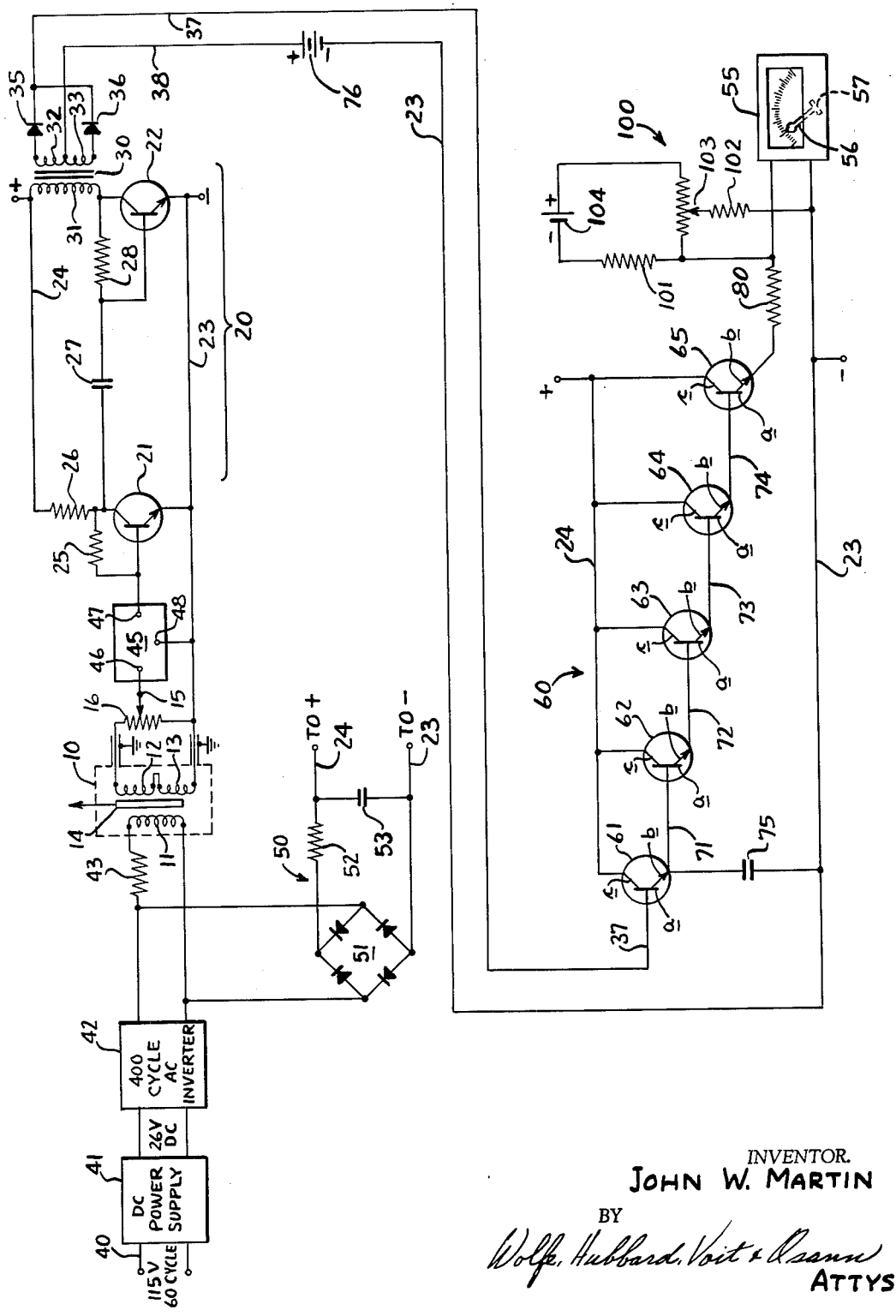
INVENTOR.
JOHN W. MARTIN
BY
Wolfe, Hubbard, Voit & Osann
ATTYS 3,212,324
PEAK READING INDICATOR
John W. Martin, Oak Park, Ill., assignor to Danly Machine Specialties, Inc., Chicago, Ill., a corporation of Illinois
Filed July 18, 1961, Ser. No. 125,003
4 Claims. (Cl. 73—88.5)

The present invention relates to a peak reading indicator and more particularly to a peak load indicator for a power press or the like.

It is an object of the present invention to provide a peak reading indicator which is easy to read, which is accurate, and which has a substantially linear response over a wide range of signal level. It is a related object to provide a load indicator which does not require any skill to obtain an accurate reading and which responds in the same way for peaks of widely varying width. As a result accurate reading is assured even though the peak may be of extremely short duration, as, for example, when punching through sheets of silicon steel or other brittle alloy. In this connection, it is an object to provide a peak load indicator which is energized from the commercial 60 cycle A.-C. supply line but which is capable of accurate response to peaks which are short as compared to the individual cycles of the supply voltage.

It is another object to provide a peak load indicator which is sensitive but which is proof against spurious indications resulting from fluctuations or transients in the commercial supply line. It is a more detailed object to provide a peak load indicator which employs a differential transformer as the sensing element but which is nevertheless independent of harmonics of the supply voltage which may exist in the output of the transformer or which may occur elsewhere in the associated circuitry.

It is a further object of the present invention to provide a peak load indicator which reads in one direction only and which is insensitive to momentary reversals of polarity which may occur in the vicinity of the null point. It is a related object to provide a peak load indicator device having novel provision for establishing the zero point on the indicator, particularly when used with a sensing device having an offset null.

It is still another object of the present invention to provide a peak reading load indicator which is stable in operation, free of drift, and not sensitive to changes in the ambient temperature. It is a further object to provide a load indicator which is proof against shock and vibration and which may be mounted directly on the press for the convenience of the operator.

It is an object of the invention to provide means for reading a peak voltage signal, which is particularly useful for power presses, but which may be used for other applications where reliable reading of a transient peak is desired.

Finally it is an object to provide a peak reading load indicator which is simple and compact, which enables a saving in expense as compared to prior devices intended for the same purpose, and which may be operated over long periods of time without care or maintenance.

Other objects and advantages of the invention will become apparent upon reference to the drawing which is in the form of a schematic diagram illustrating the preferred form of the invention.

While the invention has been described in connection with a preferred form, it will be understood that I do not intend to be limited to the specific embodiment which has been illustrated but intend to cover the various alternative uses and equivalent circuit arrangements which may be included within the spirit and scope of the appended claims.

Turning to the drawing, a sensing unit 10 is provided for producing an output signal in accordance with the strain developed in a portion of the power press with which the load indicator is to be used. In a power press it is convenient to mount the sensing unit directly upon a connecting rod since the connecting rod dimensionally responds to the loading which it carries and since the change in dimension is sufficient to insure an adequate value of output signal. For a detailed disclosure of a preferred sensing unit and the manner in which it is secured to the press connecting rod, reference is made to copending Danly and Martin application Serial 17,946, filed March 28, 1960, now abandoned. It will suffice to say that the unit includes an exciting winding 11, and two pickup windings 12, 13 connected in bucking relation. Symmetrically arranged with respect to the windings is a plunger 14 which moves endwise in accordance with the amount of strain thereby to upset the balance of the induced voltages. As a result the alternating voltage at the output terminal 15 varies directly in accordance with the amount of strain. A potentiometer 16 is interposed in the output so as to enable a predetermined portion of the output voltage to be picked off for indicating purposes.

For the purpose of amplifying the A.-C. output signal from the sensing unit, an A.-C. amplifier 20 is provided having first and second amplifying transistors 21, 22 which may be of the type TI–480. The transistors are powered from negative and positive voltage busses 23, 24 which are supplied by a direct voltage source to be described below. The first transistor has a bias resistor 25 and a load resistor 26, with the output being coupled to the second stage by a capacitor 27. The desired bias condition is achieved in the second transistor by means of a resistor 28. Connected in the output or collector circuit of the second transistor is an output transformer 30 having a primary winding 31 and secondary windings 32, 33. In order to convert the output signal to D.-C. for application to the D.-C. indicating means, the windings 32, 33 are connected to rectifiers 35, 36 which feed output lines 37, 38, the net result being that the D.-C. output voltage is proportional to displacement in the sensing unit.

In carrying out the present invention response to rapid fluctuations in the strain is improved by applying high frequency A.-C. to the input coil of the sensing unit and by including a pass filter, tuned to such frequency, in the amplifier. Thus, referring to the voltage supply for the sensing unit, it will be noted that the voltage from the regular A.-C. supply line 40 is first converted to D.-C. by a regulated D.-C. power supply 41 which may be of conventional design. The D.-C. is inverted to high frequency A.-C., preferably at 400 cycles, by an A.-C. inverter 42 which may also be of conventional design. The output of the A.-C. inverter is applied to the input coil 11 of the sensing unit through a relatively high value resistor 43 which may, for example, be on the order of 1000 ohms. The latter has the effect of improving the regulation of the voltage supplied to the winding 11. Turning to the amplifier, a 400 cycle pass filter 45 is provided having an input terminal 46, an output terminal 47, and a common terminal 48, with the filter preferably located at the amplifier input terminals. Such filters are commercially available and therefore need not be described in detail. It will be apparent, then, that any harmonics which may exist at the output of the sensing unit, especially the strong third harmonic resulting from the magnetization of the magnetic plunger 14, cannot pass through the amplifier to have an effect upon the indicating means.

In order to effectively isolate the transistor circuitry from the effects of line voltage transients and fluctuations in the commercial supply line, a direct voltage power supply 50 is provided which is energized from the 400 cycle A.-C. inverter. Such power supply includes a full wave rectifier 51 and a filter consisting of a series resistor 52 and a capacitor 53. The output voltage may be set at a desired value by adjusting the resistor 52. When using commercially available transistors, the voltage may be set at 19 volts. As a result of the present arrangement the circuit is responsive only to signal voltage.

In accordance with the present invention a conventional meter of the damped, moving coil type is provided together with a novel circuit for matching the impedance of the amplifier, which is relatively high, to the impedance of the meter, which is relatively low, as well as for sustaining the signal fed to the meter at the peak value sufficiently long to permit accurate visual observation. In the present instance the meter, indicated at 55, has a pointer 56 connected to a moving coil 57. Conventional D.C. indicating meters of the moving coil type require a finite time to achieve accurate indication, the so called "rise time" being on the order of 200 milliseconds. Meters of this type are normally useless for reading peaks or transients since the voltage may rise to the peak value and fall again before the pointer of the meter has time to respond. Thus in the lack of a holding circuit a high peak of very short duration may be evidenced on the face of a conventional meter by a small bobbing motion, dependent upon both magnitude and duration of the peak. Employing the novel holding and impedance matching circuit indicated at 60, causes the voltage to be sustained at substantially the peak value sufficiently long so that the press operator has time to make a reading.

Generally stated, my voltage holding circuit comprises a plurality of transistors, direct-coupled and having points of common connection so that the output current of one stage comprises the input current for the stage following and with capacitors for sustaining the voltage at at least one of the points of common connection. Preferably, and in accordance with the invention, the capacitor is located between the first and second transistor stages. In the form of circuit shown in the drawing a total of five transistors are used as indicated at 61–65, respectively. Silicon transistors of the NPN variety, commercially designated TI–495, are preferably employed. The transistors have the usual base, emitter and collector elements indicated by the subscripts $a$, $b$ and $c$, respectively. The transistors are connected in a "common collector" cascade circuit, with all of the collectors $61c$–$65c$ being connected to the positive bus 24 and with the current supplied to all of the transistors being cumulatively passed through the meter 55 which is connected to the negative bus.

While the circuit connections are apparent from the drawing, it will be noted that the base terminal $61a$ of the transistor 61 is connected to the D.-C. line 37 from the amplifier while the emitter $61b$ is directly connected to the base of the transistor 62 via a common connection 71. The emitter of the transistor 62 is, in turn, connected to the base of the transistor 63 via a common connection 72. The emitter of transistor 63 is connected to the base of the next transistor 64 via a common connection 73. Finally, the emitter of the transistor 64 is connected to the base of the transistor 65 via a common connection 74. The emitter of the last transistor 65 is connected to the meter 55 so that the meter conducts the cumulative current fed to all of the transistors. For signal holding purposes a storage capacitor 75 is connected to the point 71 as shown with the remaining terminal being connected to the bus 23. The value of the capacitor may be varied depending upon the degree of holding action desired between, say, 0.1 microfarad and 20 microfarads. In practice, the capacitor may have a capacitance on the order of 0.25 microfarad. Since the resistance of the transistor in the capacitor charging circuit is relatively low and since the capacitance is relatively low, the charging time constant is also low. Stated in other words, the capacitor is charged to the peak value of the signal almost instantaneously.

In accordance with one of the more detailed aspects of the invention, a source of bias voltage 76 is provided at the input of the holding and impedance matching circuit 60 so that the transistors are biased for operation over the most linear portion of the response curve. Such bias voltage, in the present instance, is preferably on the order of four volts.

In operation, applying a positive signal voltage to the line 37 causes current to flow through the base-emitter junction of transistor 61 which turns on the flow of collector current promptly charging the capacitor 75 to a voltage which depends upon the signal level. As the capacitor charges, the current is increasingly directed into the base of the transistor 62 so that this transistor conducts. This process is repeated in each stage, with the current fed into the base of the transistor 65 turning it on so that the total output current, flowing through the emitter $65b$, and indicative of the signal, is fed to the meter 55.

It is helpful in considering the charging circuitry to note typical values of voltage existing under a typical input condition. A transistor of the type described has a base to emitter voltage drop on the order of 0.5 volt. Thus when a net input signal voltage of 7.5 volts D.-C. is applied to the base of the first transistor, and relative to the negative bus 23, this produces a voltage at the emitter $61b$ of 7.0 volts which is applied across the capacitor and to the base of the second transistor 62. Because of the drop in the latter, the voltage at the emitter, and which is applied to the base of the transistor 63, is 6.5 volts. A further drop occurring in the transistor 63, produces a voltage at the emitter of the latter of 6.0 volts. Similarly, the voltage at the output of transistor 64 is 5.5 volts and at the output of transistor 65 is 5.0 volts which is applied to the meter circuit. It may be noted, however, that while the transistors are all connected to the positive bus 24 which has a voltage of 18 volts, the capacitor 75 cannot, for a 7.5 volt input, acquire a charge higher than 7.0 volts. The reason for this is that it is the flow of base-emitter current which gates the flow of current through the collector. When the voltage at the emitter $61b$ achieves a value which is within the stated 0.5 volt of the base voltage, the transistor simply turns off the collector current so no further charging current can flow. It is one of the features of the present circuit that the charge to the capacitor flows through the relatively low impedance collector circuit; thus charging may take place much more quickly than if the charge had to be supplied through the relatively high impedance signal circuit. In short, the circuit permits the rapid charging required for response to narrow, transient peaks.

Considering next the conditions immediately following passage of a peak signal, it will be apparent that conduction of the first transistor 61 is cut off. However, because of the charge on the capacitor 75, voltage (and hence current) continues to be applied to the base of the transistor 62 which maintains current flow through the base of the transistor 63 and in the succeeding portions of the circuit. Thus the output transistor 65 maintains its peak flow of output current, through the meter, for sufficient time to enable the meter to respond. While use of a holding capacitor between the first two stages is preferred, if desired, and without departing from the invention, holding capacitors may be used at the points of common connection 72, 73 or 74. Regardless of location the effect is to tend to maintain peak current flow in the succeeding stages, and in the meter, after the peak of the signal has passed.

It is one of the features of the invention that a series resistor is employed in the discharge circuit, in series with the meter in the present instance, to increase the discharge time constant so that the capacitor voltage, representative of the signal, remains within a small percentage of the peak value over the "rise time" of the meter. In practice, a series resistor 80 is used having a resistance such that the signal drops no more than five percent from the peak value within 200 milliseconds. When using a meter of 0–1 milliampere rating and of approximately 300 ohms resistance, the resistor 80 may have a resistance of approximately 4700 ohms. The total resistance is thus on the order of 5000 ohms to produce full scale deflection with 5.0 volts in the meter circuit. The series resistance should not substantially exceed this value since this will cause the time constant of the capacitor circuit to be increased to a point where a peak load during one cycle of the press may mask a peak of lesser value in the succeeding cycle of the press. The time required for the voltage applied to the meter to fall to 95% of the peak value should be no greater than, say, about two seconds.

In accordance with one of the detailed aspects of the present invention means are provided for avoiding the condition of "indeterminate zero" encountered when sensitive strain gauges of the differential transformer type are used. In other words, means are provided for avoiding the condition where a reversal of stress may produce a positive reading at the meter 55. This is accomplished by physically offsetting the plunger 14 so that it is displaced slightly in the positive direction with a reference output voltage at the terminal 15 under conditions of zero press loading. Means are moreover provided for offsetting the meter zero point so that the indicating meter reads zero for this reference output condition. In the present instance this is accomplished by a resistor compensating network 100 having series resistors 101, 102 and a potentiometer 103. The terminals of the network are connected to a steady D.C. source represented by a battery 104. To adjust the arrangement described above, the plunger 14 is physically offset a few thousandths of an inch from its centered position. The resulting unbalance causes a net output signal to exist in the circuit causing a reading of the indicating meter 55. The potentiometer 103 is then adjusted to restore the pointer 56 to zero. The pointer may be adjusted to zero by the press operator just prior to putting the press into operation and thus serves to compensate not only for the offset in the sensing unit but also for the other minor changes occurring in the circuit between periods of use. Moreover, the arrangement removes the problem of the transistor quiescent current which would arise if the circuit were operated with a null reference point.

While the invention has been described in connection with a preferred embodiment, it will be apparent to one skilled in the art that the invention is not limited to the particular circuit. For example, a capacitor could be employed at any or all of the common points of connection, 72, 73, or 74 without departing from the invention. However, connecting a capacitor directly across the input terminals of the first transistor would be less desirable since the charging circuit would have a large charging time constant and since the capacitor would tend to be discharged by the base current of the transistor. Similarly, connecting a capacitor in the output or meter circuit would be disadvantageous because of the relative low impedance of such output circuit and because of the size of the capacitor which would have to be used. The present circuit, with a storage capacitor interposed between adjacent transistor stages only, has been found to be particularly stable and effective. Moreover, since the circuit is a "common collector" circuit, the impedance presented to the input signal is desirably high.

Where the device is used on a press the physical device may be made compact and mounted in the meter housing. Since the components, other than the sensing unit itself, are not subject to mulfunction or damage upon being subjected to the shock and vibration in the frame of a power press, the device may be expected to give long trouble free life without necessity for care of maintenance. The meter employed as a final indicating element is of the type employed in other equipment with which the press operator is already familiar and may be directly calibrated in terms of percentage of load. Moreover, the swing of the pointer is found to be consistent regardless of whether the peak is of long or extremely short duration. Consequently no skill or judgment is required in reading the meter. Because of the use of high frequency A.C. in the sensing unit, the device is capable of reacting to extremely short peaks, on the order of eight milliseconds or less, as may be encountered, for example, when punching transformer laminations made of brittle silicon steel. Thus the unit may be used universally regardless of whether the press is employed for punching or forming and regardless of the size of the press.

While the device has been described for the purpose of indicating the peak loading of a power press, it will be understood by one skilled in the art that the input voltage need not be derived from a load sensing element but may be derived from any voltage source, for example, from a transducer sensing any other variable which is subject to rapid or transient changes. Hence the term "press or the like" is broadly defined as any device having a condition subject to transient or peak values which are to be measured.

I claim as my invention:

1. In a peak reading load indicator for a power press or the like the combination comprising means including an amplifier for producing a direct output voltage in response to strain in a press element, a meter having a damped inertia-possessing indicating element, a peak voltage holding circuit interposed between the amplifier and the meter, said voltage holding circuit comprising a plurality of transistors having base emitter and collector elements and defining a plurality of successive stages, a voltage source for said transistors, the input of the voltage holding circuit being connected to the amplifier and the output of the voltage holding circuit being connected to the meter, the successive stages having common connections so that the emitter element of one stage is connected in series with the base element of the succeeding stage, at least a portion of said common connections having storage capacitors for sustaining the peak value of the signal and having a discharge circuit which includes the meter, and resistor means in the discharge circuit for delaying the discharge so that the signal applied to the meter is sustained at substantially the peak value over the rise time of the meter indicator.

2. In a peak reading load indicator for a power press or the like the combination comprising means including an amplifier for producing a direct output voltage in response to strain in a press element and for producing a reference output voltage in absence of strain, a meter having a damped inertia-possessing indicating element, a peak voltage holding circuit interposed between the amplifier and the meter, said voltage holding circuit comprising a plurality of transistors having base emitter and collector elements and defining a plurality of successive stages, a voltage source for said transistors, the input of the voltage holding circuit being connected to the amplifier and the output of the voltage holding circuit being connected to the meter, the successive stages having common connections so that the emitter element of one stage is connected in series with the base element of the succeeding stage, at least a portion of said common connections having storage capacitors for sustaining the peak value of the signal, and network means associated with the meter for causing the meter to read zero for reference output voltage at the amplifier.

3. In a peak reading load indicator for a power press or the like the combination comprising means including an amplifier for producing a direct output voltage in response to strain in a press element, first and second transistors each having base emitter and collector elements, first and second voltage busses of opposite polarity, the collector elements of the transistors being directly connected to the first voltage bus, the base of the first transistor being coupled to the amplifier, a meter having a damped inertia-possessing indicating element, said meter being connected between the emitter of the second transistor and the second voltage bus, the emitter of the first transistor and the base of the second having a common connection, a capacitor shunted between said connection and said second voltage bus so that the peak value of the signal from the amplifier means is sustained at the base of the second transistor sufficiently long for the meter to give a reading of the peak signal notwithstanding the inertia and damping of the meter indicating element.

4. In a peak reading load indicator for a power press or the like the combination comprising means including an amplifier for producing a direct output voltage in response to strain in a press element, first and second transistors each having base emitter and collector elements, a positive bus, a negative bus, a meter having a damped inertia-possessing indicating element, the collector elements being connected to said positive bus, the amplifier being connected to feed a signal between the base of the first transistor and the negative bus, the meter being connected between the emitter of the second transistor and the negative bus, the emitter of the first transistor and the base of the second transistor being connected together and having a capacitor for coupling the same to the negative bus so that the signal indicative of maximum load is sustained on the base element of the second transistor sufficiently long as to cause the meter to read substantially the peak value of the signal notwithstanding the damping and inertia of its indicating element.

References Cited by the Examiner
UNITED STATES PATENTS

| | | | |
|---|---|---|---|
| 2,340,714 | 2/44 | Traver et al. | 324—71 X |
| 2,864,904 | 12/58 | Jensen | 330—19 |
| 2,925,544 | 2/60 | Lang | 330—19 |
| 2,963,693 | 12/60 | Capalozza | 324—111 X |
| 2,997,651 | 8/61 | Richeson et al. | 324—111 |
| 3,009,108 | 11/61 | Breuning | 324—111 |
| 3,047,847 | 7/62 | Marsh el al. | 324—71 X |

OTHER REFERENCES

Kidd, M. C.: "Two-Stage D.C. Coupled Amplifier;" RCA Technical Notes; RCA TN No. 191 (1 page).

RICHARD C. QUEISSER, *Primary Examiner.*

ROBERT L. EVANS, DAVID SCHONBERG,
*Examiners.*